G. GRIESCHE.
GRANITE AND STONE SAW.
APPLICATION FILED MAR. 11, 1916.
1,208,774.
Patented Dec. 19, 1916.
Fig. 1.
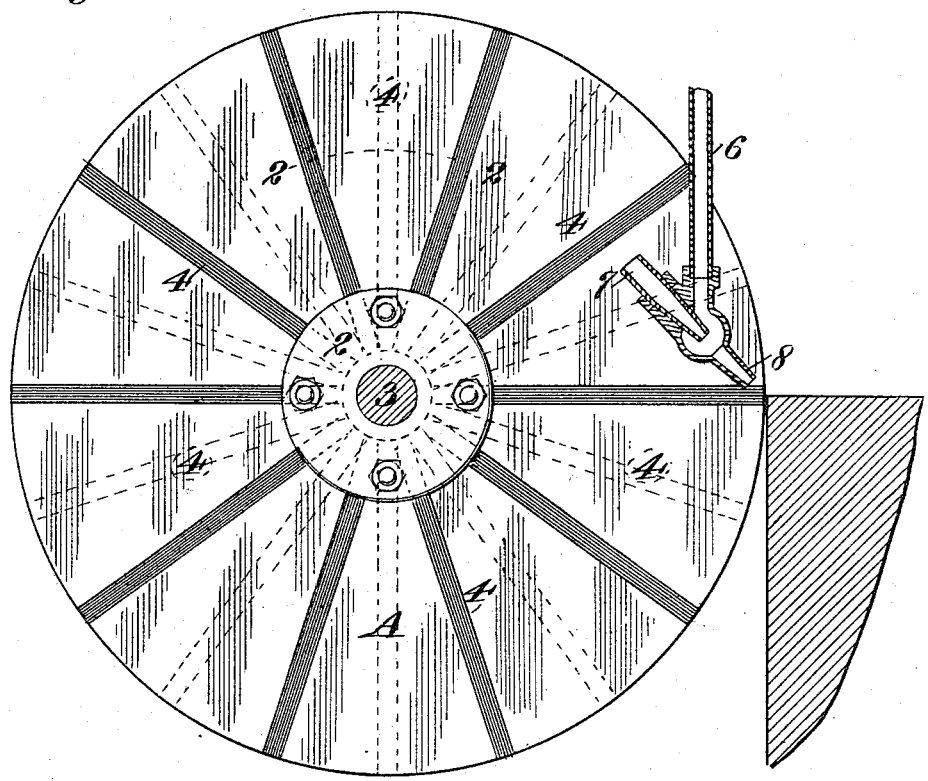
Fig. 2.
Fig. 3.
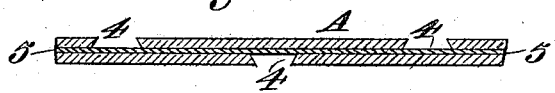
Fig. 4.
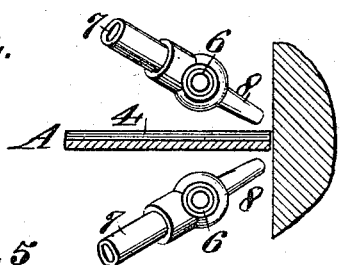
WITNESSES:
Charles Rokles
Thos. Castberg
Fig. 5.
INVENTOR
Gustav Griesche,
BY Strong & Townsend
ATTORNEY

UNITED STATES PATENT OFFICE.

GUSTAV GRIESCHE, OF BERKELEY, CALIFORNIA.

GRANITE AND STONE SAW.

1,208,774.

Specification of Letters Patent.  Patented Dec. 19, 1916.

Application filed March 11, 1916. Serial No. 83,557.

*To all whom it may concern:*

Be it known that I, GUSTAV GRIESCHE, a citizen of the United States, residing at Berkeley, in the county of Alameda and State of California, have invented new and useful Improvement in Granite and Stone Saws, of which the following is a specification.

My invention relates to improvements in that class of apparatus in which granite, stone and like substances are cut by the abrasion of a saw of suitable character, in conjunction with the abrasive substance interposed between the saw and the material to be cut.

The invention consists in a novel construction of the saw, means to introduce and retain abrasive material in contact with the surface to be cut, and in details of construction which will be more fully explained by reference to the accompanying drawings, in which—

Figure 1 is a face view of my saw, showing in full lines the radial channels on one side thereof, also the device for supplying abrasive material. Figs. 2 and 5 are sectional views of the saw, taken on the line 2—2 of Fig. 1, showing different forms of the channels. Fig. 3 is a view showing a different method of construction of the saw blade. Fig. 4 is a view, showing the means for supplying the abrasive material and its direction.

For the cutting of stone, granite and like substances a reciprocating or rotary saw is employed, the edge of which is caused to travel over the surface of the substance to be cut, and in conjunction with this an abrasive material, such as sharp sand, or the like, is introduced between the contacting surfaces.

In my invention I have improved the character of the saw, particularly in regard to the channels in its face, into which the abrasive material is delivered and the means by which the abrasive material is continually delivered toward the surface to be cut.

A is the blade of a stone saw, having a hub 2 and a drive-shaft 3, upon which the saw is mounted. This saw blade may be made of a plate of sufficient thickness to enable the radial channels 4 to be cut alternately in opposite faces of the saw, or it may be made of sections riveted or welded together to make one blade. These channels are particularly designed to have sharp angles which may either be acute, as shown in Fig. 2, or at right angles with the face, as in Fig. 5, the object being in either case to retain an abrasive material which is delivered into the channels and to cause this material to flow in the direction of the surface to be cut.

In Fig. 3 I have shown the saw made of a plurality of plates or sections which may be riveted or otherwise secured upon opposite sides of an intermediate plate 5, which plate is sufficiently thick to receive the channeled plates upon opposite sides without making the whole device too thick for the purposes desired.

In order to increase the cutting effect of such a saw an abrasive material, such as sharp sand, shot, or the like, may be delivered into the groove cut by the saw. This is effected through a supply pipe 6 down which it may flow by gravitation, and a hydraulic pipe 7 serves to discharge a current of water through the nozzle 8 into which both pipes 6 and 7 converge. The nozzle is so placed, with relation to the saw, that the abrasive material will be discharged outwardly, and for this reason and by the centrifugal force derived from the revolution of a circular saw the abrasive material will be continually thrown outwardly against the surface and in the channel which is cut by the saw. I have here shown two of these nozzles, one upon each side of the saw, and the abrasive material is thus discharged alternately into the channels 4 as they pass the nozzles 8. The acute or sharp angles of the channels serve to retain the abrasive material therein and to cause it to flow outwardly and into contact with the surface which is being operated upon with very superior effects.

Having thus described my invention, what I claim and desire to secure by Letters Patent is—

1. The combination in a stone sawing device, of a circular saw having radial, acute angled grooves alternating upon the opposite sides, and a pair of supply ducts converging outwardly upon each side of the periphery of the saw, said ducts discharging into the grooves and into the kerf formed in the stone.

2. The combination of a circular granite and stone saw, having acute angled radial grooves or recesses, and abrasive material ducts converging outwardly upon each side of the saw and directed into the grooves and into the kerf.

In testimony whereof I have hereunto set my hand in the presence of two subscribing witnesses.

GUSTAV GRIESCHE.

Witnesses:
CHARLES PICKLES,
JOHN H. HERRING.

Copies of this patent may be obtained for five cents each, by addressing the "Commissioner of Patents, Washington, D. C."